United States Patent
Yi et al.

(10) Patent No.: US 11,577,164 B2
(45) Date of Patent: Feb. 14, 2023

(54) SYSTEM AND METHOD FOR AUDITING GAMEPLAY

(71) Applicants: Min Yi, Manassas, VA (US); Arthur Iinuma, Beverly Hills, CA (US)

(72) Inventors: Min Yi, Manassas, VA (US); Arthur Iinuma, Beverly Hills, CA (US)

(73) Assignee: Min Yi, Manassas, VA (US)

( * ) Notice: Subject to any disclaimer, the term of this patent is extended or adjusted under 35 U.S.C. 154(b) by 11 days.

(21) Appl. No.: 17/094,003

(22) Filed: Nov. 10, 2020

(65) Prior Publication Data
US 2021/0052981 A1   Feb. 25, 2021

Related U.S. Application Data

(63) Continuation-in-part of application No. 16/228,309, filed on Dec. 20, 2018, now Pat. No. 10,867,474.

(51) Int. Cl.
*A63F 13/35* (2014.01)
*A63F 13/77* (2014.01)
*G07F 17/32* (2006.01)

(52) U.S. Cl.
CPC ............. *A63F 13/35* (2014.09); *A63F 13/77* (2014.09); *G07F 17/3225* (2013.01); *G07F 17/3244* (2013.01)

(58) Field of Classification Search
CPC ...... A63F 13/35; A63F 13/77; G07F 17/3225; G07F 17/3241; G07F 17/3244
USPC .......................................................... 463/25
See application file for complete search history.

(56) References Cited

U.S. PATENT DOCUMENTS

| | | | |
|---|---|---|---|
| 8,449,378 B2 | 5/2013 | Michaelson et al. | |
| 8,523,657 B2 | 9/2013 | Michaelson et al. | |
| 10,586,427 B2 | 3/2020 | Yi | |
| 2014/0194188 A1 | 7/2014 | Kosta et al. | |
| 2014/0295956 A1 | 10/2014 | Katz et al. | |
| 2014/0370969 A1 | 12/2014 | Lemay et al. | |
| 2016/0027260 A1 | 1/2016 | Pierce et al. | |
| 2016/0162897 A1* | 6/2016 | Feeney | H04L 9/3236 705/71 |
| 2018/0025442 A1 | 1/2018 | Isaacson et al. | |
| 2018/0211487 A1 | 7/2018 | Fine et al. | |
| 2018/0276626 A1* | 9/2018 | Laiben | H04L 9/3239 |

(Continued)

OTHER PUBLICATIONS

PCT International Search Report and Written Opinion dated Dec. 10, 2021, PCT International Application No. PCT/US21/49692, pp. 1-7.

*Primary Examiner* — Allen Chan
(74) *Attorney, Agent, or Firm* — Resolute Legal PLLC

(57) ABSTRACT

In various implementations, systems and methods of an online gaming platform may include an audit module for corroborating fair gameplay. In some implementations, the online gaming platform can be integrated with one or more cryptocurrency exchanges to facilitate cryptocurrency transactions as well as other currency transactions. In some implementations, the cryptocurrency exchanges can be integrated with an online gaming platform that offer games, such as poker and blackjack games, enabling that the games can be played with any one or more cryptocurrencies. In some implementations, the players can pay for gameplay directly from one or more crypto currency exchange account. In some implementations, players can verify that the gameplay in the online gaming platform was fair.

20 Claims, 6 Drawing Sheets

(56) References Cited

U.S. PATENT DOCUMENTS

2019/0180558 A1* 6/2019 Merati .................. H04L 9/0637
2020/0342479 A1 10/2020 Buck

* cited by examiner

SYSTEM AND METHOD FOR AUDITING GAMEPLAY

CROSS REFERENCE TO RELATED APPLICATION

This application is a continuation-in-part of U.S. Pat. No. 10,867,474 filed Dec. 20, 2018, the contents which are hereby incorporated by reference in its entirety.

FIELD OF THE DISCLOSURE

The present disclosure relates to an online gaming platform, and in particular, the present disclosure relates to an online gaming platform integrating multiple virtual currencies and data handling for verifying fair gameplay.

BACKGROUND

In recent years, digital currencies have become more popular and have become widely accepted as an alternative to traditional the government issued (fiat) currency. Many digital currencies, particularly Bitcoin, have made their way into a vast range of business transactions. Instead of using fiat currency to buy items, holders of digital currencies can use them to buy both goods and services. Given that digital currencies have made their way into mainstream commerce, there is now a need to allow people to use digital currencies such as Bitcoin as an alternative to fiat currencies when playing online games.

Known online gaming platforms suffer from potential fraud by gaming operators. In particular, in games of chance, there is an economic incentive to cheat. For example, online games like a dice roll, blackjack, keno, bingo, poker, roulette, craps, paigow, and like games that involve betting (e.g., wagering) create an economic incentive to cheat. Games of chance operated on a website, mobile application, desktop application or other digital means all have a specific vulnerability to cheating that can be exploited by their creators, maintainers, or operators. Certain tweaks can be made to the software program that can tilt the odds in favor of the house or a conspiring player. For example, the software program can be tweaked by allowing one player to view the hole cards of any other player in poker or in blackjack, or by only revealing dice roll values that favor the house. Because the software program that dictates how a game is played is executed on a remote computer server with code that is largely obfuscated from the players, it is nearly impossible for a participant/player to know if a cheat is being implemented. The remote nature of online play also means that a player with an advantage can cheat without other players knowing since their screens are not visible to other player(s).

Since the players typically do not have access to the source code that runs on a remote server, it would be difficult to prove that a cheat is implemented. Certain platforms claim to be provably fair by making their code "open source" or essentially publishing the code for all to see. A savvy developer theoretically could identify malicious code that provides an edge to the house. However, the published code may differ from the source code that is actually deployed in the gaming platform.

Thus, a need exists for a system that allows verifying fair gameplay.

SUMMARY

Various implementations of the systems and methods are directed to an online gaming platform that provides for corroborating fair gameplay.

In some implementations, the online gaming platform facilitates one or more players to play games with one or more cryptocurrencies simultaneously. In some implementations, the player can also play games with one or more fiat currencies along with one or more cryptocurrencies.

In some implementations, the online gaming platform enables players to seamlessly play online games with one or more virtual currencies.

In some implementations, the online gaming platform enables players to play games directly from a crypto exchange account (e.g., player can pay for game play, including placing wagers, from one or more cryptocurrency exchange accounts).

In some implementations, the online gaming platform enables players to verify fair gameplay.

In various implementations, a system and method for playing online games includes the games of chance. In some implementations, the system and method can include an online gaming platform that further includes, but is not limited to, a gaming engine module, virtual currency module, and an audit module. In some implementations, the online gaming platform may include an integrated an online cryptocurrency exchange that facilitates or enables players to perform transactions or exchanges of one or more cryptocurrency and one or more fiat currency. In some implementations, the online cryptocurrency exchange can be integrated with online gaming platforms such as casino games, poker games, and the like, such that the games are played with any cryptocurrency and/or fiat currency seamlessly. In some implementations, the online gaming platform enables players to play one or more games directly from the crypto exchange account. In some implementations, the cryptocurrencies may include, but are not limited to, Bitcoin™ (BTC), Litecoin (LTC), XRP (Ripple), or any other cryptocurrency or currency type. In some implementations, the players can play a game using uniform cryptocurrency coins. In some implementations, the player can play a game using different (non-uniform) cryptocurrency coins (or even fiat currency).

In one example implementation, one or more players use the online gaming platform to play a wagering game using Bitcoin. In some implementations, an estimated value in various fiat currencies of one or more player's Bitcoin is shown next to a player's total quantity of Bitcoin. The estimation can be shown one in or more diverse types of currencies such as Dollar, Euros, Yen, Yuan, or any other currency type (including cryptocurrencies) chosen by the players. In this example, the players wager using Bitcoin, but the estimation value (in other currencies) of the Bitcoin is shown for friendly use. In some implementations, the game pot can be shown in Bitcoin and can also be shown in an estimated choice of one or more other currency values. In some implementations, the rake in the game can be taken with Bitcoin. In some implementations, the online gaming platform sets (or resets as the case may be) the Bitcoin to dollar currency value exchange rate at or before the start of the game as per the market value. In some implementations, the online gaming platform maintains the Bitcoin to dollar currency value exchange rate at the same until the game is finished. In some implementations, the online gaming platform varies the Bitcoin to dollar currency value exchange rate as the market changes during gameplay. It should be appreciated that while Bitcoin currency was used for this example, other suitable cryptocurrencies can be used.

In some implementations, the online gaming platform enables one or more different types of cryptocurrencies to be use for a game. As one such example, a first player can use a Bitcoin or a portion of a Bitcoin, a second player can use 10-ETH, a third player can use 3000-XRP, and a Fourth player can use 40 LTC, and a fifth player can use 250 EOS. It should be appreciated that the variation in quantities of the cryptocurrencies can reflect the differences in relative value of these cryptocurrencies. In some implementations, the players can bet or wager in their cryptocurrency and have an estimation illustrating the bet in diverse types of currencies such as USD, Euros, Yen, Yuan, or any other type of currency (including other cryptocurrencies) chosen by the player relative to the cryptocurrency they use to play the game. In some implementations, the players may bet in their own cryptocurrency, but the estimation values are illustrated next to their cryptocurrencies. Thus, the players can play a game with diverse types of cryptocurrencies having diverse estimation values. In some implementations, when the players bet, they can bet in dollar values equivalents of their cryptocurrency. In some implementations, the game pot is displayed in a fiat currency (like the US dollar). In other implementations, another fiat currency or another cryptocurrency can be used for the game pot and the online gaming platform can manage the exchange between the various currencies used by players during the game. In some implementations, a player can play a game in the online gaming platform using one or more currencies (e.g., fiat or cryptocurrencies) for one game. For example, a player may have a first quantity of a first cryptocurrency and a second quantity of a second cryptocurrency. In some implementations, the player may exhaust the first quantity of the first cryptocurrency during a game and need to use the second quantity of the second cryptocurrency to stay in the game. It should be appreciated that in some implementations, the online gaming platform may enable a player to use one or more different currencies (e.g., Bitcoin, Ethereum, and USD) during one play of a game (e.g., during one round of a poker game).

In some implementations the online gaming platform calculates the values of players' cryptocurrencies into an estimated dollar value (or some other suitable currency) during the gameplay. When a pot for a game is awarded to a winning player, the online gaming platform can convert the game pot estimated dollar value into the player's selected currency (e.g., cryptocurrency or fiat currency) coins. In some implementations, a winning player may take the game pot in dollar value. In some implementations, such as in a poker game played using the online gaming platform, a rake can be taken from the pot. In some implementations, the dollar value relative to the available other currencies can be reset at the start of a game to the then existing market values and may remain at the same values until the game is finished.

In some implementations, the one or more types of cryptocurrencies can be used to play a game with the online gaming platform without converting the one or more types of cryptocurrencies to match a particular currency. In such an example scenario the first player may have Bitcoins, the second player may have ETH, the third player may have XRP (Ripple), the fourth player may have LTC, and the fifth player may have EOS. It should be appreciated that the cryptocurrencies used in this example can be any suitable cryptocurrency. In some implementations, the online gaming platform enables players to play using their respective cryptocurrencies directly from their crypto wallet (e.g., players can pay for game play, including placing wagers, from one or more cryptocurrency exchange accounts that are accessible through the online gaming platform). For example, in some implementations, players can use the online gaming platform's interface to request transfer of the player's cryptocurrency from a third party cryptocurrency exchange system, over to the online gaming platform's for purchasing game play (e.g., rounds of a game, wagering, betting, etc.), and then send any accumulated or remaining cryptocurrency stored with the online gaming platform back to the player's connected cryptocurrency exchange account so a player can trade the cryptocurrency or cash out as the player sees fit. In some implementations, the players bet in their own choice of currency. When the game pot is awarded to the winning player, the winner is paid with the respective currencies used by the players involved in the game. In some implementations, the rake is also paid with the currencies used by the players involved in the game. In a poker example, players can place wagers with the currency of their choice at the same table with other players having a currency of their choice, which may be one or more different currencies (e.g., cryptocurrencies and/or fiat currencies). This facilitates playing directly from the player's crypto wallet while the player is seated with other players each playing with a currency of their respective choice.

In some implementations, the online gaming platform provides for auditing the gameplay. In some implementations, auditing gameplay can provide for later corroborating fair gameplay and to discover any cheating or other system problems. Such auditing is beneficial for online games where the outcome of the game is not known beforehand, and where there is an economic incentive to cheat. In some implementations, the audit comprises publishing game activities in an encrypted form to a database. In some implementations, manipulation of the published game activities can be authenticated by one or more hashes generated from the published game activities and recording the hash with a blockchain server. In some implementations, the game values entered by each player during gameplay can be recorded on the user's device or any alternate location. In some implementations, the game values of players that participated in a game can be pooled and compared with the published game activities data to ensure the fair gameplay. A difference can indicate unfair gameplay.

DETAILED DESCRIPTION

Figure 1:
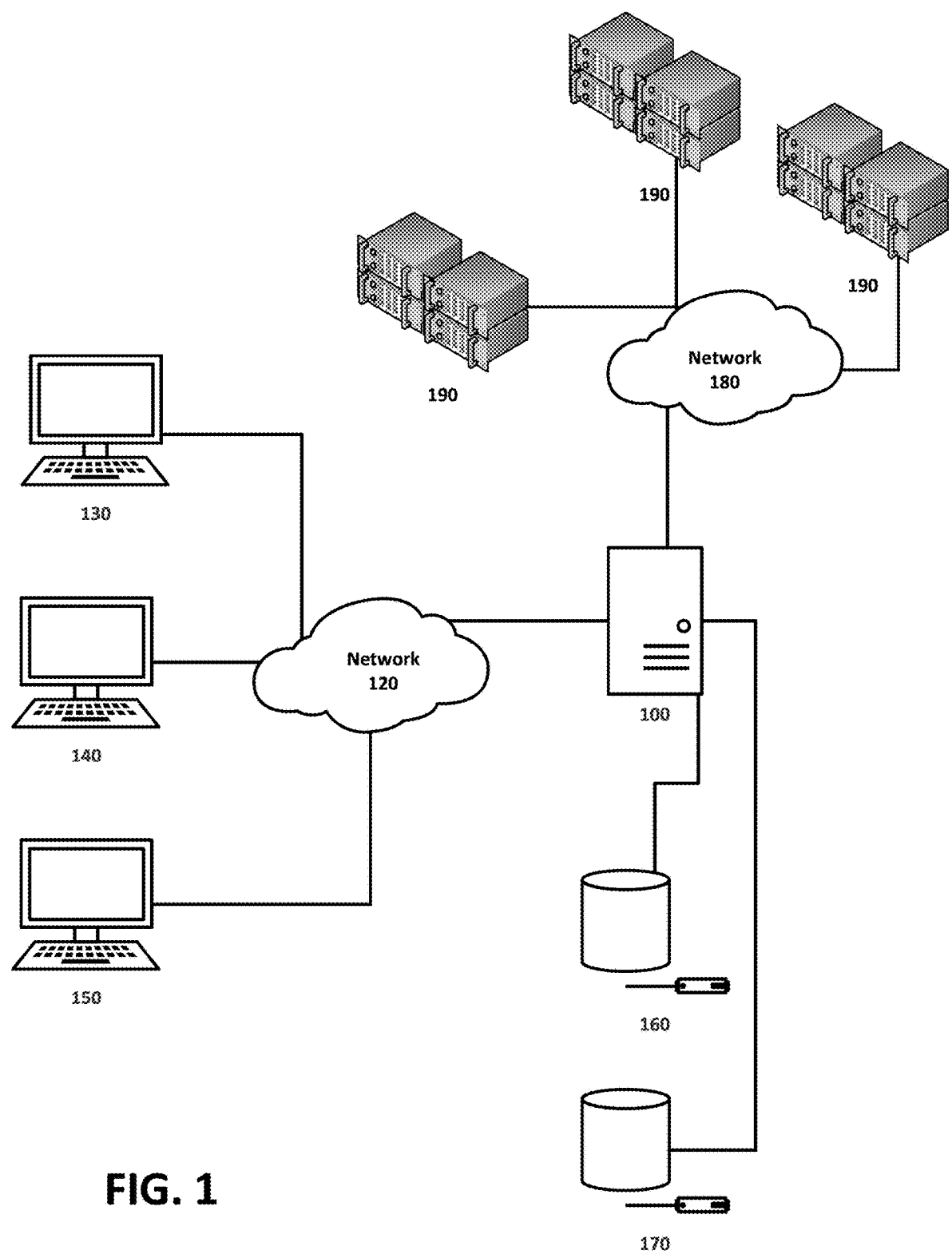
FIG. 1 illustrates an example implementation of an environment diagram showing possible components of the online gaming platform.

Subject matter related to a system and method for an online gaming platform will now be described more fully hereinafter. Subject matter may, however, be embodied in a variety of different forms and, therefore, covered or claimed subject matter is intended to be construed as not being limited to any particular implementation set forth herein; examples are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The terminology used herein is for the purpose of describing particular implementations and is not intended to be limiting of such implementations. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details.

Now referring to FIG. 1 which shows an online gaming platform 100 embodied as a system. The online gaming platform 100 is communicable with at least one client computing device 130 over a network 120. FIG. 1 shows an example online gaming platform 100 in communication with three client computing devices 130, 140, and 150. It should be appreciated that the online gaming platform 100 can be in communication with any suitable number of "n" client computing devices (e.g., 100s, 1000s, etc.) The client computing devices can be associated with players participating in online gameplay. The online gaming platform 100 can be further in communication to at least one database 160 for storing software associated with the games and account information of players. In some implementations, online gaming platform 100 may be in communication with one or more other databases 170 to store game activity data of the gameplays hosted by the online gaming platform 100. Although FIG. 1 shows two databases 160 and 170, it will be appreciated by a skilled person that a single database can be used or more than one databased can be provided. Similarly, the online gaming platform 100 may include any suitable number of databases to accomplish the system and methods discussed here. Similarly, FIG. 1 shows the online gaming platform embodied as a system. However, one or more modules of the online gaming platform 100 can also be incorporated into one or more client computing devices. Furthermore, it can be seen in FIG. 1 that the online gaming platform 100 can be in communication with one or more blockchain nodes 190 through a network 180 (e.g., Ethereum blockchain nodes, etc.). In some implementations, network 120 and network 180 can be the same. In some implementations, network 120 and network 180 can be different.

The network 120 and/or the network 180 can be wired or wireless network. The wired network may include Digital Subscriber Line (DSL), coaxial cable lines, or optical fiber lines. The wireless network may include BLUETOOTH, Wi-Fi, Worldwide Interoperability for Microwave Access (WiMAX), an infrared channel or satellite band. The wireless network may also include any cellular network standards used to communicate among mobile devices, including standards that qualify as 3G, 4G, or 5G. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. The geographical scope of the networks 120/180 may vary widely and the networks 120/180 can be a body area network (BAN), a personal area network (PAN), a local-area network (LAN), e.g. Intranet, a metropolitan area network (MAN), a wide area network (WAN), or the Internet. The networks 120/180 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include the application layer, transport layer, internet layer (including, e.g., IPv6), or the link layer. The networks 120/180 may be a type of a broadcast network, a telecommunications network, a data communication network, or a computer network.

Figure 2:
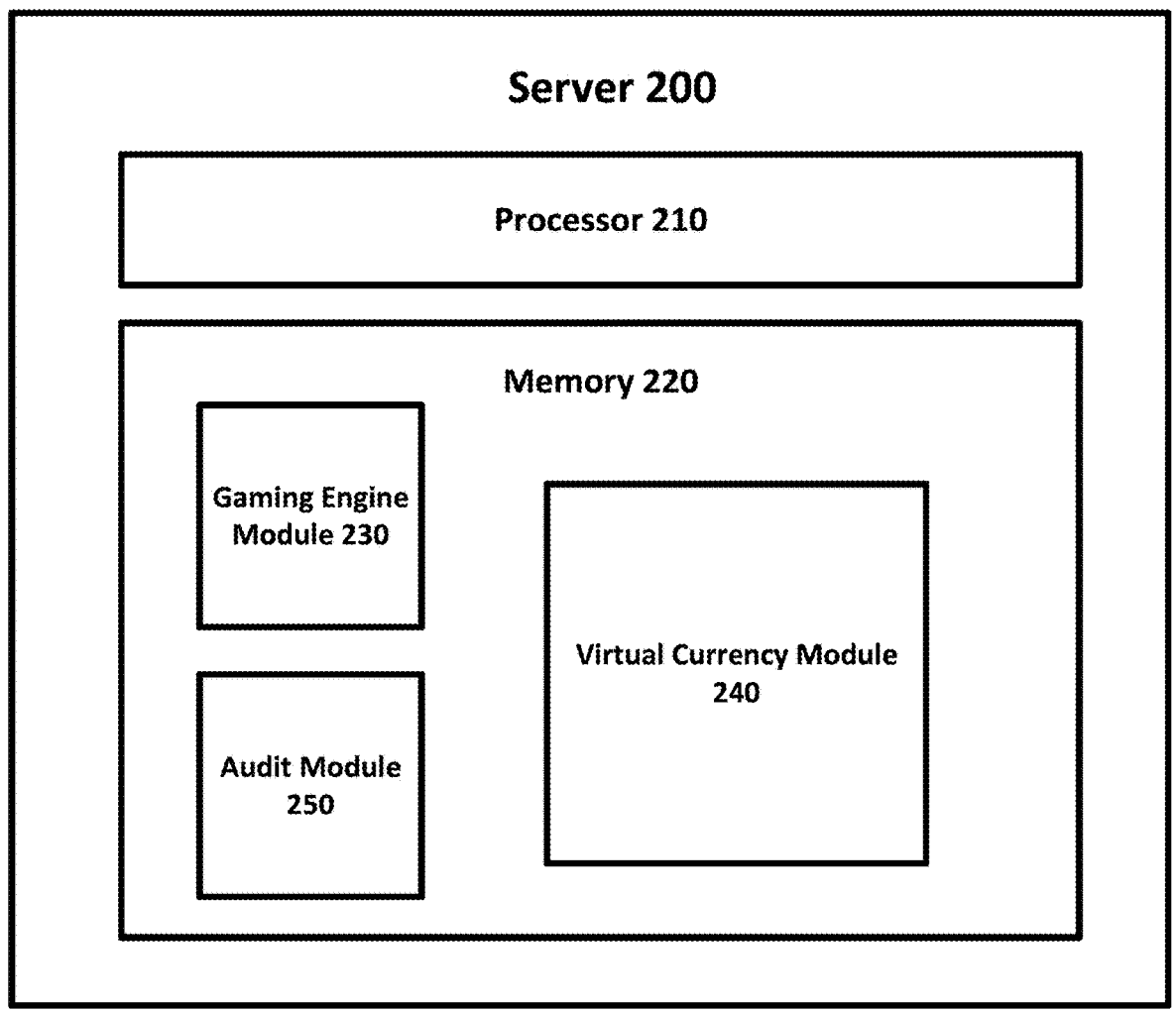
FIG. 2 illustrates an example implementation of a block diagram showing a server of the online gaming platform.

FIG. 2 is a block diagram of the online gaming platform 100 shown as a server 200. It should be appreciated that the online gaming platform 100 may include one or more servers such as server 200. In some implementations, multiple servers can be clustered. In some implementations, multiple servers can be distributed across a geographic region, country, and/or the world. In some implementations, the server resources are cloud based server resources such as found in a Platform as a Service that can scale up or scale down as the more or fewer client computing devices (e.g., client computing devices 130, 140, 150) access the online gaming platform 100. In some implementations, the server providing online gaming platform 100 can also be configured in a LAN environment. In some implementations, the server 200 may include one or more processors 210 and one or more memory 220. The memory 220 may include a gaming engine module 230 stored on the memory 220 and executable by the processor 210. In some implementations, the gaming engine module 230 includes program code that when executed, can generate one or more interactive gameplay instances playable on the client computing devices such as example client computing devices 130, 140, or 150. In some implementations, the memory 220 may include a virtual currency module 240 stored on the memory 220 and executable by the processor 210. In some implementations, the virtual currency module 240 may have program code that when executed, issues and manages virtual currency accounts in addition to performing currency exchange between fiat currency and virtual currency. In some implementations, as shown in FIG. 2, the memory 220 may include an audit module 250 executable by the processor 210. In some implementations, the audit module 250 includes program code that when executed, causes the processor 210 to provide auditing of gameplay executed by the gaming engine module 230 of the online gaming platform 100.

In some implementations, the server 200 is configured for storing, processing, and providing provably fair games to a player (the games may include wagering games or non-wagering games). For this purpose, servers 200 and the client computing devices may include memory, one or more processors, and one or more communication modules. The processor may be a suitable processor such as a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In one implementation, the server 200 may include one or more hardware-based modules (e.g., DSP, FPGA, ASIC) and/or software-based modules (e.g., a module of computer code stored in the memory 220 and executed by a processor 210, a set of processor-readable instructions that may be stored in the memory 220 and executed by a processor 210) associated with executing an application, such as, for example, online gaming application.

In some implementations the server 200 may be connected to one or more databases (e.g., in memory and/or through a wired and/or a wireless connection, such as databases 160 and 170) for storing provably fair gameplay data received from client computing devices connected to the server 200 via the communication network for gameplay. The server 200 may further comprise a User Interface (UI) directly coupled to the database to facilitate the display of provably fair game data stored in the database.

Any database discussed herein may include relational, hierarchical, graphical, object-oriented structure, flat, noSQL and/or any other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), MySQL, or any other suitable database product. Moreover, the databases may be organized in any suitable manner, for example, as data tables or lookup tables. Database records may be a single file, a series of files, a linked series of data fields, or any other data structure. Association of certain data may be accomplished through any suitable data association technique.

In some implementations, the virtual currency module 240 further comprises program code that when executed, can cause a processor 210 to issue credits, tokens, money, and/or gifts as virtual currency bundles.

In some implementations, the virtual currency may be purchased using real currency, credit virtual currency, special virtual currency, ordinary virtual currency, and/or the like. In some implementations, virtual currency may be obtained through the online gaming platform 100 by winning the virtual currency, receiving the virtual currency as a gift, and/or the like.

In some implementations, the online gaming platform 100 can further comprise a ghost module for operably coupling the online gaming platform 100 with other crypto exchange platforms and also third-party crypto exchange platforms. In some implementations, the ghost module couples the gaming module with the virtual currency module seamlessly to enable the player to play the game straight from his/her exchange or wallet. Thus, in some implementations, the ghost module seamlessly integrates the cryptocurrency coins generated under diverse types of blockchain technology in the cryptocurrency market for example ERC20.

In some implementations, the player can play the game and use third party exchanges straight from their account with the online gaming platform 100, thereby eliminating the need for the online gaming platform 100 to hold any of the player's funds.

In some implementations, the online gaming platform 100 may include a digital wallet module (not shown). In some implementations, server 200 may be configured to manage one or more different types of currency (e.g., fiat currency, cryptocurrency, etc.). In some such implementations, a player may deposit funds/currency into a digital wallet associated with the player and maintained in the online gaming platform 100. Thus, in some implementations, the online gaming platform 100 can hold the player's funds/currencies during gameplay and trade in one or more currencies using the online gaming platform 100. The player is at least partially empowered to operate their wallet.

In some implementations, online gaming platform 100 communicates with a digital wallet module that can reside on a client computing device (e.g., client computing device 130). In some implementations, the digital wallet module can be a standalone application or embedded in a web browser application. In some implementations where the online gaming platform 100 uses a digital wallet module on a client computing device, the player's funds/currencies usable in the online gaming platform 100 are not stored in the online gaming platform 100, but the player's funds/currencies are stored in the digital wallet associated with the player. Further, the player may be provided with private keys so as to fully empower the player to operate the wallet.

In some implementations, the virtual currency module is configured to generate and store a record of one or more transactions. In one implementation, transaction details may be included in a transaction details data structure included as part of the request. For example, the transaction details data structure may be passed as an argument to a function written in a suitable programming language (e.g., the transaction details data structure may include a variety of fields such as the unique ID (UID) for a player involved in the transaction, type of virtual currency to be credited, amount of virtual currency to be credited, and/or the like).

In some implementations, the online gaming platform 100 can provide games that are configured to be played with particular currencies, such as Bitcoin™ (BTC), Litecoin (LTC), XRP (Ripple) or any other currency/cryptocurrency type. In some implementations, the online gaming platform 100 enables the players to play games with uniform cryptocurrency coins. In some implementations, the online gaming platform 100 enables players to play games with one or more different cryptocurrency coins. In some implementations, the online gaming platform 100 enables players to play game with one or more different currencies (e.g., fiat and/or cryptocurrencies).

In an example implementation, the online gaming platform 100 is configured to enable players to play in a uniform cryptocurrency of Bitcoin currency. In some implementations, the online gaming platform 100 enables client computing devices to display an estimate of the Bitcoin currency relative to a fiat currency next to the total available Bitcoin currency for a player at a client computing device. For example, the estimation can be shown in one or more types of real currencies such as Dollar, Euros, Yen, Yuan, or any other currency type (e.g., including cryptocurrency) chosen by the players. In some implementations, while the player is playing a game and wagering using Bitcoin, the online gaming platform 100 may provide an estimate valuation of the Bitcoin in one or more other currencies. In some implementations, the online gaming platform 100 provides a poker game that includes tracking a game pot (e.g., a value of wagered money for the game) and a rake. In some implementations, the online gaming platform 100 displays the game pot in Bitcoin and may also provide an estimated value in one or more selected currencies. In some implementations, the rake (e.g., commission fee taken by the house or dealer) in the game can be taken with Bitcoin currency. In some implementations, as noted above, the dollar currency value relative to Bitcoin can be reset before start of the game (or at some other suitable time) as per the market value. In some implementations, the online gaming platform 100 maintains Bitcoin value relative to the dollar until the game is finished. That is, in some implementations, online gaming platform 100 keeps the value of Bitcoin to the US dollar the same during a play of a game, despite potential market fluctuations. In some implementations, online gaming platform 100 tracks the value of Bitcoin to the US dollar during a play of a game and calculates wager values, pot values, and rake values during the play of the game to keep pace with market fluctuations.

In some implementations, the online gaming platform 100 enables the player to convert virtual currency into a requested real currency or vice versa. For this purpose, the online gaming platform 100 may determine a conversion rate between the real currency and the requested virtual currency. The online gaming platform 100 may determine the conversion rate with one or more third party cryptocurrency exchanges. In some implementations, the online gaming platform 100 maintains its own cryptocurrency exchange. In some implementations, the conversion rate may be static (e.g., it may be retrieved from a database). In another example implementation, the conversion rate may be calculated dynamically (e.g., based on information associated at the time of the beginning the game). Accordingly, the present disclosure enables embedding the currency conversion to the online games from a live cryptocurrency exchange market.

In another example implementation of a game played on the online gaming platform 100, diverse types of cryptocurrencies can be used for a game (e.g., a poker game). In one example, a first player may use Bitcoins, a second player may use 10 ETH (Ethereum) coins, a third player may use 3000 XRP (Ripple) coins, a fourth player may use 40 LTC (Litecoin) coins, and a fifth player may use 250 EOS coins. The different numbers of coin may reflect the difference in values of the various cryptocurrencies relative to each other. Thus, in some implementations, the online gaming platform 100 enables players to play in the cryptocurrency of their own choosing. In some implementations, the online gaming platform 100 calculates relative values of the played cryptocurrencies to one or more other types of other currencies (e.g., fiat currency or cryptocurrency) such as USD, Euros, Yen, Yuan, or any other type of currency chosen by the players. The players bet in their own coin, but the estimation values are illustrated next to the cryptocurrencies. The players are in the game with diverse types of coins having different estimation values relative to other currencies. In some implementations, when the players place wagers/betting, the player may bet in dollar values of their selected currency. In some implementations, the online gaming platform 100 maintains the game pot in a single currency (e.g., USD).

In some implementations, the online gaming platform 100 calculates the values of the player's selected currency into an estimated dollar value during the gameplay. When the online gaming platform 100 determines a winning player, the online gaming platform 100 may award the game pot to the winner player. The online gaming platform 100 may convert the game pot's dollar value (or other suitable currency) into the player's selected currency (e.g., LTC, Bitcoin, etc.) and provide the winning player with the game pot in the converted currency. In some implementations, the rake is taken as a percentage of the winner's coins in the converted currency. In some implementations, the rake is taken as a percentage of the game pot's dollar value. In some implementations, the online gaming platform 100 resets the dollar currency value relative to other currencies at start of the game to the market value and keeps the relative values the same until the gameplay of the game is finished (e.g., when the winner is paid the game pot).

In yet another example implementation where the player can play a game through the online gaming platform 100 using their own selected currency, the online gaming platform 100 enables players to play a game from their own cryptocurrency wallets. In some implementations, the players enable access to the player's cryptocurrency wallets using application programming interfaces to push and/or pull cryptocurrency from the player's cryptocurrency wallets for gameplay. In some implementations, when the online gaming platform 100 awards the game pot to a winning player, the online gaming platform 100 plays the winning player with the respective currencies of all the players involved in the game and also the rake is paid with the currency of all the players involved in the game. That is, in some implementations, the online gaming platform 100 does not convert one or more of the currencies to other currencies. For example, if a poker game is played with Bitcoin, XRP, and LTC, the online gaming platform 100 may award a winning player in Bitcoin, XRP, and LTC (e.g., the currencies used to form the game pot). Similarly, the rake percentage may be taken in Bitcoin, XRP, and LTC. Thus, in some implementations, players play with a currency of their choice (e.g., a game of poker can be played with one or more different currencies). This facilitates playing directly from the player's crypto wallet while seated with other players playing with currency of their choice. In some implementations, the players are responsible for converting any won currencies into a preferred currency. In some implementations, the conversion can be performed through an exchange associated with the online gaming platform 100. In some implementations, the players can perform the currency exchange through a third-party exchange.

In another example implementation, a first player owns a cryptocurrency wallet with Bitcoin currency and plays a game through the online gaming platform 100 with a second player that owns XRP currency. In a scenario that when the first player wins the game, the online gaming platform 100 awards the game pot with all the cryptocurrency coins that the players played with. That is, the online gaming platform 100 pays the first player with Bitcoin currency along with the XRP currency of the second player. Further, in some implementations, the rake is paid with the currency of all the players involved, which is Bitcoin and XRP currencies.

In some implementations, the online gaming platform 100 can enable a game to be played with fiat currency and/or cryptocurrency. In some implementations, real/fiat currencies representing different countries can be used for gameplay at a game (such as a poker game) along with one or more virtual currencies. In some implementations, players may use a virtual wallet with real money or a real wallet with real money along with a virtual wallet with virtual money and participate in the online game. In some implementations, the players can wager/bet in one of a real/fiat currency and one of a virtual currency. When the online gaming platform 100 awards a game pot to a winning player, the game pot can be awarded in a combination of the real/fiat currency and a virtual currency. Likewise, the rake can be taken in a combination of the real/fiat currency and a virtual currency. In some implementations, the online gaming platform 100 may convert any of the currencies used to play the game into one or more other currencies before paying out any winnings or while wagers are made at the request of a player.

In some implementations, the online gaming platform 100 disclosed herein integrates a crypto exchange platform with online poker game, for example, which distinguished the present disclosure from prior art online games with cryptocurrency. The integration of the crypto exchange platform with the online gaming platform as disclosed herein eliminates the need for the player to buy a particular currency to participate in a game (e.g., host (game industry) coin to play a game) and enables players to play games with the currency of their choice and receive winnings in that same currency coin or another currency of their choice.

In some implementations, all or a portion of the online gaming platform 100 may be configured as an application in the client computing device. Applications, as used herein, include any set of computing instructions. Applications instruct an electronic device to perform specified functions. Applications typically contain logic and methods for accessing, manipulating, and storing data. Examples of applications include word processors, web browsers, email clients, games (e.g., chess games), and media players. Applications may contain instructions on displaying and formatting data. For example, an application may instruct an electronic device to access certain data and display it in a specified format and/or at a specified time.

Applications may be transported via any method suitable for such purpose. For example, the applications may be downloaded to the client computing device via a Web browser or may be transported to the client computing device using a "push" type operation via a network protocol over a cable or wireless infrastructure. Possible means for pushing an application or application reference include, but are not limited to email, embedding in a Web page, part of an RSS feed, a WAP™ Push or a Bluetooth™ Transmission. The system for deploying applications to the client computing device may optionally include a runtime environment for the application. A runtime environment is software that allows a client computing device to execute application code.

In one implementation, virtual currencies are transferred between accounts by utilizing funds held "on-platform" to perform gameplay, and crediting said funds back to an "off-platform" source at the conclusion of a round of gameplay. The virtual currency can be transferred off-platform, directly to a player's blockchain wallet. In some implementations, the player is the only individual who possesses the cryptographic keys to this wallet, and therefore is the sole owner of the funds credited. Also, the mechanism in which this transfer and exchange occurs is performed programmatically using the standards provided by the blockchain technologies that support each of the virtual currencies described such as Litecoin or Ethereum. This allows the exchange and off-platform transfer of virtual currencies to occur seamlessly and substantially in real-time. This significantly reduces risks that the players funds are stuck in a centralized system.

Furthermore, player funds can be utilized by the player in any way they see fit. Players are no longer dependent on the "platform" once it is transferred "off-platform." Additionally, because of the use of a virtual currency exchange in the online gaming platform 100, the player can select any number of a dozen or more virtual currencies they wish to redeem their funds in, negating any risks of using a single proprietary virtual currency standard. In some implementations, the online gaming platform 100 can create auditable records of gameplay that are public and difficult to manipulate to enable players and others to corroborate fair gameplay (including corroborating unfair gameplay). In some implementations, the online gaming platform 100 creates auditable records of gameplay by capturing gameplay data and storing the gameplay data on a public blockchain ledger/database. In some implementations, recording gameplay records on a public blockchain enables a player and others to utilize the public blockchain ledger as a source of history to audit past gameplay data records to verify whether or not any entities involved in the gameplay were cheating or otherwise committing malfeasance. In a poker game example, since a player will know their own card hands, as well as all visible cards, a player can compare their known hand histories with records on the blockchain to validate accuracy of gameplay of one or more rounds of a poker game. Additionally, with gameplay data records stored on a public blockchain, a player can view a history of cards dealt for one or more rounds and potentially determine if any patterns exist that suggest any undisclosed advantage for "the house" or any particular player.

While examples of capturing gameplay data discussed herein describe wagering games, it should be appreciated that the auditing system can be applied to non-wagering games. In some implementations, the auditing system may be extended to capture non-gameplay data, such as access and use of any other suitable systems. For example, if a non-gaming system can generate and capture data on user activities (e.g., while a user accesses a web based application or software program), these user activities can be recorded on a blockchain and later audited to determine whether any improper activities were detected.

In some implementations, the features and functions that enable corroboration of fair gameplay in the online gaming platform 100 can be included in an audit module 250 that can work with the gaming engine module 230. In some implementations, the online gaming platform 100 can include the features and functions that enable corroboration of fair gameplay separate from audit module 250. In some implementations, the one or more features and functions that enable corroboration of fair gameplay can be included in systems/servers separate from the online gaming platform 100.

In some implementations that enable corroboration of fair gameplay, the online gaming platform 100 can use the audit module 250 to capture game activity (e.g., gameplay data) and store the captured game activity in one or more databases. In some implementations, the databases may include blockchain ledgers/databases. In some implementations, the online gaming platform 100 may use suitable cryptographic algorithms and cryptographic functions (e.g., SHA-256 secure hash algorithms or other suitable algorithms) to encrypt stored gameplay data. In some implementations, the online gaming platform 100 enables provably fair gameplay by utilizing one or more public and immutable blockchain ledgers (e.g., a blockchain system such as Ethereum), to record gameplay data for subsequent auditing.

Figure 3:
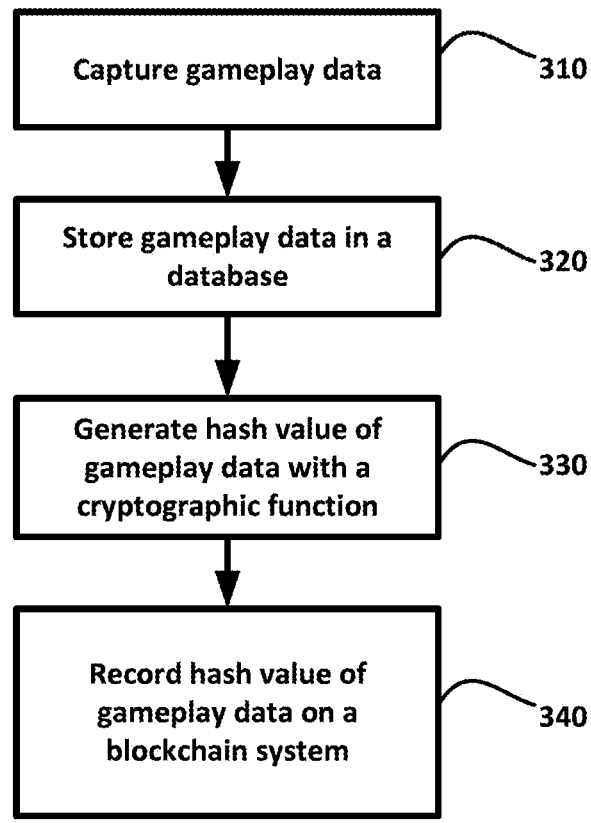
FIG. 3 illustrates a flow chart of an example implementation of a method capturing and storing gameplay data for auditing and verifying fair gameplay.

Turning to FIG. 3, in some implementations, an online gaming platform 100 enables auditing of gameplay data to enable players to verify fair gameplay. In some implementations, as illustrated in block 310, the online gaming platform 100 may capture gameplay data so that it can be later reviewed and audited. In some implementations, the online gaming platform 100 may capture gameplay data in real-time or in substantially near real-time. For example, in an electronic poker game, the online gaming platform 100 may capture data such as cards dealt to particular players, wagers of players, total pot value, winner of a round of a poker game, etc. In some implementations, the online gaming platform 100 captures gameplay data after a round of a game is complete. For example, the online gaming platform 100 may capture gameplay data for a round of a poker game after a winning player of the round of poker is determined.

In some implementations, the online gaming platform 100 communicates with one or more client computing devices to execute a game and the online gaming platform 100 and the client computing devices create gameplay data that the online gaming platform 100 captures and stores. In some implementations, the one or more client computing devices (e.g., client computing devices 130, 140, 150, etc.) are configured to run a gaming application. In some implementations, the game application can exist as a desktop client, a website, a mobile app, or other digital form. In some implementations, the online gaming platform 100 and client computing devices may communicate with each other via an application programming interface ("API") to exchange gameplay data that enables players (e.g., at client computing devices) to play one or more rounds of one or more selected games. For example, the gaming application may execute at least a portion of a poker game (or other suitable game). In some implementations, the online gaming platform 100 may be in communication with one or more of the client computing devices (e.g., 130, 140, and 150) to execute a full poker game. The online gaming platform 100 may randomly determine cards to be dealt to players and communicate these cards to the players in a poker game (e.g., on respective client computing devices). The players may determine what wagers to place or whether to fold. The client computing devices may communicate such player game actions back to the online gaming platform 100. The online gaming platform 100 may receive player game actions (e.g., player gameplay data) and distribute at least some of the player game actions to other players (e.g., wager amount, folding, etc.). As the online gaming platform 100 deals cards and receives player gameplay data (e.g., wagers, folding, etc.) the online gaming platform 100 may capture such gameplay data (among other gameplay data) and store this gameplay data in an appropriate data store.

In some implementations, a client computing device may transmit gameplay data generated at the client computing device to the online gaming platform 100 in an encrypted form. For example, a client computing device may encrypt captured gameplay data from the game application before sending the captured gameplay data to the online gaming platform 100. In some implementations, client computing devices may also use a secure, encrypted communication protocols (e.g., SSH or other suitable encrypted communications protocol) to transmit and receive encrypted gameplay data with the online gaming platform 100 and thus may send gameplay data (whether separately encrypted or not), over an encrypted virtual communication tunnel using the encryption communication protocols. It should be appreciated that in some implementations, communications between the online gaming platform 100 and client computing devices may occur without using encrypted communication protocols. In some implementations, the online gaming platform 100 can receive encrypted data from client communication devices over unencrypted channels and can decrypt the received gameplay data.

In some implementations (using a poker game as an example), the online gaming platform 100 (e.g., through audit module 250) may capture raw gameplay data such as, but not limited to, fiat to cryptocurrency conversion values, bet values in fiat currencies, bet values in cryptocurrencies, player IDs, house rake, hand play types, card values, game outcome, total pot value, game number, hand number. The online gaming platform 100 may capture these various raw gameplay data elements as the game progresses and/or following conclusion of a round (e.g., after a winner is determined). It should be appreciated that the audit module 250 may capture fewer or more gameplay data elements. In some implementations, the online gaming platform 100 can substantially continuously, in real-time or in substantially real-time, capture the gameplay data and store the gameplay data.

In some implementations, as illustrated at block 320, the online gaming platform 100 may store captured raw gameplay data in one or more databases (e.g., database 160, database 170, etc.). In some implementations, the online gaming platform 100 can store raw gameplay data for one or more rounds of a game. In some implementations, the online gaming platform 100 may store different rounds of gameplay data (e.g., a round of poker, a round of blackjack, a round of a boardgame, etc.) as separate records. For example, a round of poker may include the initial ante through to a determination of a winner player that wins the pot. The online gaming platform 100 may store the raw gameplay data for rounds of games so that such data for individual rounds of gameplay can be accessed and reviewed at a later point in time (e.g., to confirm winning outcomes, to look for cheating patterns, etc.). In some implementations, the online gaming platform 100 may encrypt the raw gameplay data stored in the databases. In some implementations, the databases storing raw gameplay data are encrypted. In some implementations, records associated with a round of a game can be individually encrypted or encrypted as a grouping of multiple rounds of a game (e.g., from a first round 1 to an Nth round of gameplay).

In some implementations, a client computing device may also be configured to capture and store one or more elements of gameplay data along with the online gaming platform 100. As gameplay occurs (e.g., as a poker game or blackjack game is played), one or more gameplay data values from a game are produced by a game application at a client computing device (e.g., client computing device 130) and the online gaming platform 100. The gameplay data values from both the client computing devices and the online gaming platform 100 can also be captured and recorded in a database associated with one or more client computing devices, just as they are with the online gaming platform 100. In some implementations, the game application may communicate with its own localized data store or database, which may synchronize captured gameplay data with a cloud hosted database (e.g., database 160 or database 170) through a network (e.g., network 120). In some implementations, the databases (e.g., whether for the online gaming platform 100 or the client computing devices) used to store gameplay data can contain the necessary data table structures to record one or more desired gameplay data values.

In some implementations, as illustrated at block 330, the online gaming platform 100 may generate hash values of one or more rounds of gameplay data. For example, in some implementations, the online gaming platform 100 may apply a cryptographic function (e.g., SHA-256 or other suitable cryptographic function) to a round of raw gameplay data that was capture and stored in a database as discussed in connection with block 320. For example, the online gaming platform 100 may apply the SHA-256 function to a round of raw gameplay data for a poker game, such as, but not limited to, fiat to cryptocurrency conversion values, bet values in fiat currencies, bet values in cryptocurrencies, player IDs, house rake, hand play types, card values, game outcome, total pot value, game number, hand number and convert this raw data into a 64 digit hexadecimal alphanumeric value (a hash value of the round of gameplay data). In some implementations, the online gaming platform 100 applies the cryptographic function to one round of raw gameplay data. In some implementations, the online gaming platform 100 applies the cryptographic function to one or more rounds of raw gameplay data. In some implementations, the online gaming platform 100 stores the resulting hash value for a round of raw gameplay data in a database associated with the online gaming platform 100 (e.g., database 160, database 170, etc.). In some implementations, the online gaming platform 100 does not store the resulting hash value of the raw gameplay data in a database associated with the online gaming platform 100.

In some implementations, as illustrated in block 340, the online gaming platform 100 may transmit the hash value of the raw gameplay data to a blockchain system and request that the blockchain system record the hash value of the raw gameplay data in the blockchain system's ledger/database. In some implementations, the online gaming platform 100 is in communication with one or more blockchain systems (e.g., the Ethereum or other suitable blockchain system). One blockchain system is represented in FIG. 1 as one or more blockchain nodes 190. The online gaming platform 100 may transmit the hash value of the round of raw gameplay data to a node 190 of the blockchain system to be written and stored in the blockchain system's ledger/database. In some implementations, the online gaming platform 100 may write the captured gameplay/game activity data to the blockchain system using a "Smart Contract," a transactional API system, or a proprietary application layer that enables the blockchain system to receive and write data from servers/systems external to the blockchain. In some implementations, the blockchain system receives the information provided by the online gaming platform 100 and records it onto the blockchain ledger/database. In some implementations, the information recorded onto the blockchain system is immutable and is written to one or more nodes 190 of the blockchain to ensure that the information recorded is distributed across one or more servers. In some implementations, attempts to modify information on one node of the blockchain can be detected because the other distributed copies on other nodes of the blockchain will not match with the modified information.

It should be appreciated that while the blockchain systems are discussed in terms of one or more distributed nodes, in some implementations the blockchain system can be implemented in a single node. In some implementations of a blockchain system with a single node, the single node may include one or more servers and/or one or more servers running one or more virtual server instances that include multiple copies of a blockchain ledger (or database). In some implementations, as a blockchain ledger is updated at a single node, the blockchain system may make identical updates to the blockchain ledger in multiple of the virtual server instances.

In some implementations, the online gaming platform 100 may transmit hash values of gameplay data to a blockchain system in real-time or near real-time so that the blockchain system can write the hash values of gameplay data to the blockchain ledger/database quickly. For example, the online gaming platform 100 may transmit a hash value of gameplay data to the blockchain system as the hash value is generated. In some implementations, by writing the hash values to the blockchain quickly, there is less opportunity for improper alterations of gameplay data to occur. In some implementations, as is discussed below in greater detail, the online gaming platform 100 may delay transmitting and writing hash values to a blockchain system. In some implementations, the online gaming platform 100 may wait until a predetermined quantity of hash values for rounds of gameplay data is generated before transmitting batch quantities of such hash values.

In some implementations, the online gaming platform 100 may also make available raw gameplay data of one or more rounds of a game to one or more players. For example, for a first set of two players that participated in first round of a poker game, the online gaming platform 100 may enable this first set of two players that participated in the first round of the poker game to access raw gameplay data of the first round of the poker game. For a second set of three players that participated in a second round of a poker game, the online gaming platform 100 may enable the second set of three players to access raw gameplay data of the second round of the poker game. In some implementations, the online gaming platform 100 does not allow the first set of two players to access the raw gameplay data of the second round of the poker game unless the players were also participants in the second round of the poker game. Likewise, in some implementations, the online gaming platform 100 does not enable the second set of three players to access the raw gameplay data of the first round of the poker game unless the three players were participants in the first round of the poker game. In some implementations, the online gaming platform 100 may provide access to the raw gameplay data online through a website, for download, and/or through the gaming application on a client computing device. It should be appreciated that the online gaming platform 100 may provide access to the raw gameplay data to players in any suitable manner.

In some implementations, online gaming platform 100 may delay providing access to raw gameplay data for a predetermined time period (e.g., 24-hour delay or some other suitable delay). In some implementations, the delay can be used to prevent players from gaining an advantage during gameplay through immediate knowledge of any other players' cards or how other players play. In some implementations, as noted above, raw gameplay data is made visible to those players that participated in a specific round of a game. In some implementations, raw gameplay data is not made visible to those players that did not participate in a specific round of a game. In some implementations, raw gameplay data can be made visible to anyone that wants to view the gameplay data.

It should be appreciated that by storing raw gameplay data, creating hash values of raw gameplay data, making hash values of gameplay data available on a public blockchain, and making raw gameplay data available to players, the online gaming platform 100 enables players to audit previously played games and verify gameplay data. For example, to confirm the raw gameplay data made available to players has not been altered at any point thereafter, a player can input the raw gameplay values supplied, through the same cryptographic function used to create the hash values and compare the output with the hash value posted on a public blockchain ledger. If the comparison between the hash value stored in the public blockchain ledger and the hash value the player generated from the available raw gameplay data results in a match, the gameplay data supplied is the same as what was recorded during live gameplay. If the comparison do not result in a match, this may indicate that the gameplay data provided to the player by the online gaming platform 100 is not the same as the game play data used to produce the hash value recorded on the blockchain, and therefore evidence that the gameplay data was potentially altered. Moreover, in some implementations, the player may independently record raw gameplay data as the player participates in games. The player may also use this independently recorded raw gameplay data to generate hash values to compare against the hash values recorded on a public blockchain.

Figure 4:
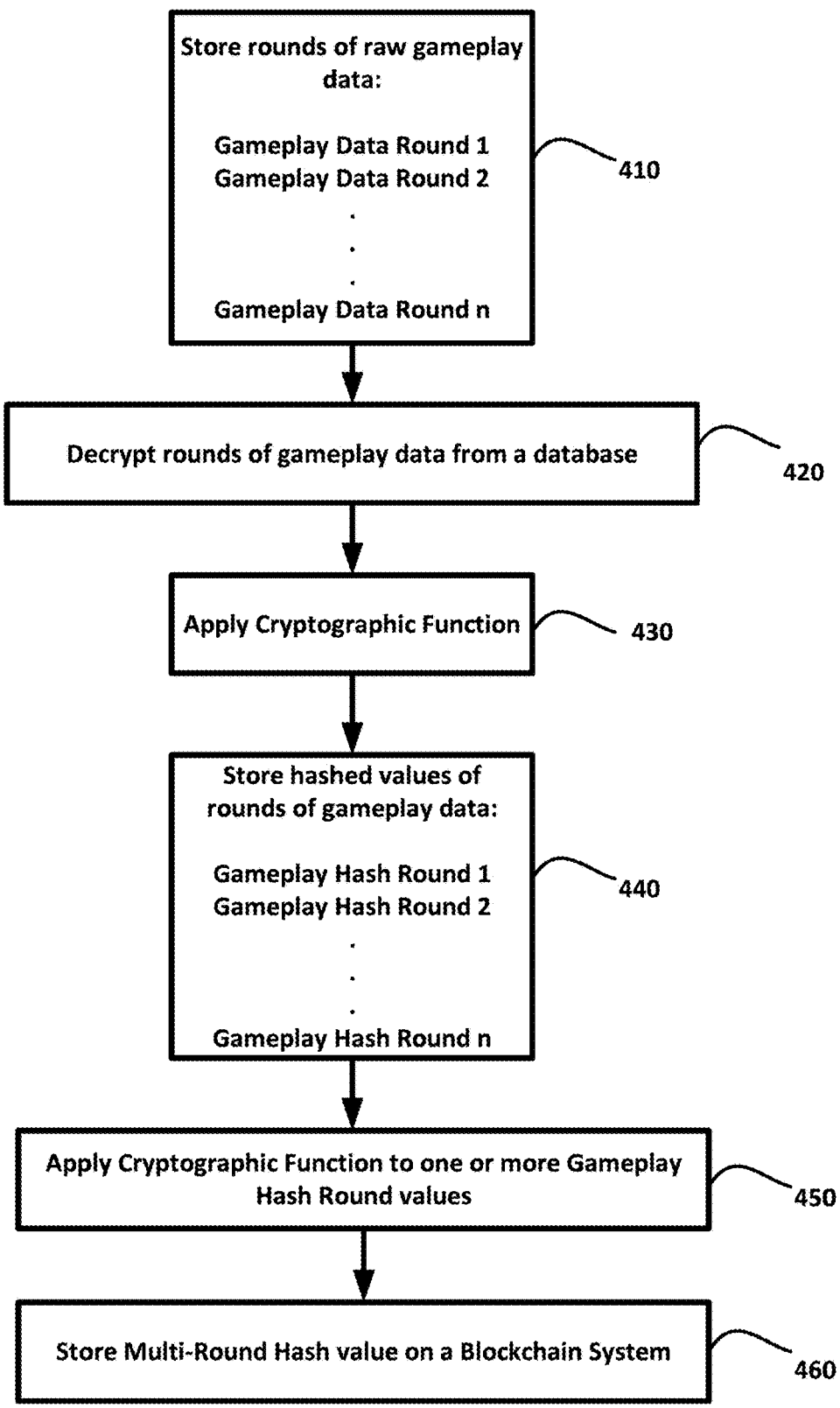
FIG. 4 illustrates a flow chart of an example implementation of a method of capturing and storing gameplay data for auditing and verifying fair gameplay.

Turning now to FIG. 4, in some implementations, the online gaming platform 100 may transmit and store multiple gameplay data records in a blockchain system using fewer transactions to improve system efficiency and reduce system cost.

Distributed public blockchains sometimes have limitations in their transaction throughput and therefore may not be able to record the entirety of all gameplay records in substantial real-time or on an individual basis. Therefore, in some implementations, an off-chain queuing system can be used to concatenate a batch of gameplay data values (e.g., gameplay data from multiple different rounds of a game), feed groupings of these rounds of gameplay data values into a cryptographic function, and then record the resulting output hash onto the blockchain. Since the length of the hash generally does not change based on the volume of information submitted to a cryptographic function, large amounts of information (e.g., multiple rounds of gameplay data) can be consolidated into smaller payloads to write to a blockchain ledger (e.g., a blockchain database). In addition to reducing the data communication loads, the processor loads, and memory usage, consolidating multiple rounds of gameplay data into fewer and smaller payloads also enables the online gaming platform 100 to minimalize expenses associated with blockchain transaction fees (e.g., fees for saving data to a blockchain ledger/database).

In some implementations, the online gaming platform 100 can store gameplay data for one or more rounds of a game in a blockchain system so that the stored gameplay data can be later audited to determine that one or more rounds of prior gameplay were fair. In some implementations, the online gaming platform 100 may accumulate gameplay data from one or more rounds of one or more games. In some implementations, the online gaming platform 100 may store different rounds of gameplay data (e.g., a round of poker, a round of blackjack, a round of a boardgame, etc.) as separate records. For example, a round of poker may include the initial ante through to a determination of a winning player that wins the pot. As noted above, a round of a poker game may generate raw gameplay data such as, but not limited to, bet values in fiat currencies, bet values in cryptocurrencies, player IDs, rake, hand play types, card values, game outcome, total pot value, game number, hand number. In some implementations, as shown in block 410, the online gaming platform 100 may store such raw gameplay data in a database associated with rounds of a game. In some implementations, the online gaming platform 100 may encrypt the raw gameplay data stored in the database. In some implementations, the database is encrypted. In some implementations, data associated with an individual round of gameplay can be encrypted separately or encrypted as a grouping of multiple different rounds of gameplay data (e.g., from a first round 1 to an Nth round of gameplay).

In some implementations, as shown in block 420, the online gaming platform 100 may decrypt one or more rounds of stored gameplay data in preparation to transmit the gameplay data to a blockchain system. It should be appreciated that in some implementations, block 420 is not used where the stored gameplay data is not encrypted in a database.

As shown in block 430, in some implementations, the online gaming platform 100 may apply one or more cryptographic functions (e.g., SHA-256 or other suitable algorithm) to one or more rounds of decrypted gameplay data. In some implementations, the online gaming platform 100 may apply a cryptographic function to one round of decrypted gameplay data to form one hash value of such a round of gameplay data. For example, a round of a poker game that includes the following raw gameplay data elements: bet values in fiat currencies, bet values in cryptocurrencies, player IDs, rake, hand play types, card values, game outcome, total pot value, game number, and hand number can be converted into an alphanumeric string (e.g. a hash value). If the same cryptographic function is applied to the same gameplay data, the resulting hash value will be the same. In some implementations, a hash value of the gameplay data is created to maintain privacy of the gameplay data. In some implementations, a hash value of the gameplay data is also created to reduce the quantity of data that is written to a blockchain system, as will be discussed below. It should be appreciated that writing a hash value of the gameplay data creates a smaller data payload to write to a blockchain system's ledger. In some implementations, the online gaming platform 100 may individually hash one or more rounds of gameplay data using one or more cryptographic functions to create multiple individual hash values for respective different rounds of gameplay data.

In some implementations, as shown in block 440, the online gaming platform 100 may store these created hash values in one or more databases, such as database 160 or database 170. In some implementations, the online gaming platform 100 may store the created hash values as the online gaming platform 100 creates hash values of the rounds of gameplay data. In some implementations, the online gaming platform 100 performs blocks 420, 430, and 440 on one stored round of raw gameplay data at a time. In some implementations, the online gaming platform 100 performs blocks 420, 430, and 440 in batches of stored rounds of raw gameplay data. In some implementations, the batches are run based on a predetermined elapsed period of time (e.g., every 10 minutes). In some implementations, the online gaming platform 100 determines when to perform blocks 420, 430, and 440 based on the quantity of rounds of gameplay data that are stored in the database at block 410. For example, in some implementations, the online gaming platform 100 may perform blocks 420, 430, and 440 when the online gaming platform 100 determines that a predetermined quantity of rounds has been played and stored in a database associated with the online gaming platform 100. In some implementations, the predetermined quantity of rounds is 10 rounds of gameplay. However, any suitable number can be used for the predetermined quantity of rounds.

In some implementations, as shown in block 450, the online gaming platform 100 may select a predetermined quantity of hash values (e.g., hashed rounds of gameplay data) for additional conversion to a new hash value. For example, the online gaming platform 100 may select 10 hash values and apply a cryptographic function to the 10 hash values to create a multi-round hash value. It should be appreciated that the selected quantity of hash values can be any suitable number 1 to N. The selected quantity of hash values to combine into a multi-round hash value may depend on balancing cost (of writing data to a blockchain system) and efficiency.

In some implementations, as shown in block 460, the online gaming platform 100 transmits the created multi-round hash value to a blockchain system for entry into the blockchain system's ledger/database. It should be appreciated that when data is written to a blockchain ledger, there is often a monetary cost associated with the transaction. For example, writing data to a blockchain system may cost $0.33 for each transaction (e.g., executing a smart contract on the Ethereum blockchain). Thus, if the online gaming platform 100 hosted 1000s of rounds of games per minute and gameplay data for the many rounds of games are individually written to the blockchain system, the cost of storing the individual rounds of gameplay data can quickly become very expensive. In some implementations, because of the distributed nature of the blockchain system, frequent writes to the ledger becomes difficult or impossible. In some implementations, as an alternative, quantities of rounds of gameplay data can be grouped (and condensed into a single hash value) to minimize the number of writes to a blockchain system as discussed in block 440 and block 450. In some implementations, the online gaming platform 100 may record the multi-round hash value to one or more blockchain systems. In some implementations, the blockchain systems can be private or public. In some implementations, public blockchain systems provide the ability for the general public to inspect the records stored in the public blockchain. Thus, the multi-round hash values can be discovered by the general public. In some implementations, the online gaming platform 100 may create the various hash values of the gameplay data close in time to when gameplay of a particular round of a game is completed. For example, in some implementations, the online gaming platform 100 may create the various hash values (e.g., hash values of block 440 and/or block 450) of the gameplay data within seconds or minutes of completion of a round of a game. In some implementations, a near contemporaneous or near real-time generation of hash values from completion of a game round may provide additional security to the online gaming platform 100 so that it is more difficult to alter stored gameplay data. In some implementations, the online gaming platform 100 may create the various hash values (e.g., hash values of block 440 and/or block 450) of the gameplay data at any suitable time after completion of one or more rounds of a game. That is, in some implementations, the online gaming platform 100 may alternatively perform the hash value creation hours and/or days after gameplay data is created.

In some implementations, the online gaming platform 100 may use both a private and a public blockchain system. In some implementations, the online gaming platform 100 may record gameplay data on a private blockchain system as an intermediary step to recording gameplay data on a public blockchain. Like a public blockchain system, a private blockchain system can be used to provide integrity of the gameplay data. In some implementations, once enough new gameplay data is accumulated on the private blockchain system, the online gaming platform 100 may then create appropriate hash values of the new gameplay data on the private blockchain system to write to the public blockchain system. In some implementations, the gameplay data is hashed in a same or similar manner described above before the gameplay data is written to the private blockchain. These hash values stored in the private blockchain system can then be written individually or in hashed groups and written to a public blockchain at an appropriate time (e.g., after a predetermined period of time, after a certain quantity of rounds of a game are complete and hashed). In some implementations, raw gameplay data can be written to the private blockchain data without creating hash values of the raw gameplay data. In some implementations, the raw gameplay data is data elements such as, but not limited to, bet values in fiat currencies, bet values in cryptocurrencies, player IDs, rake, hand play types, card values, game outcome, total pot value, game number, and hand number. In some implementations, the raw gameplay data can be encrypted before being written to the private blockchain. In some implementations, the raw data is written in an unencrypted form before being written to the private blockchain. In some implementations, block 410 in FIG. 4 illustrates raw data being written to a private blockchain system. In some such implementations, the online gaming platform 100 retrieves stored raw gameplay data from the private blockchain system to perform at least block 420 and block 430.

It should be appreciated that while various features and functions are described in connection with the audit module 250, these features and functions can be included in other portions of the online gaming platform 100. In some implementations, one or more of the features and functions can be included in other separate systems. In some implementations, for example, one or more of the features and functions of the audit modules 250 can be included and executed in one or more client computing devices.

In implementations, it should be appreciated that hash values of individual rounds can be recorded separately on a public blockchain. Still in an alternate implementation, if a game has one round, the online gaming platform 100 can generate a single hash value from the gameplay data, which can be recorded with on a public blockchain.

It should be appreciated that in some implementations, a hash value recorded on a public blockchain becomes a permanent record and can be used to corroborate a fair gameplay. As can be appreciated, information recorded on a sufficiently distributed and decentralized public blockchain are extremely difficult to hack or improperly alter. For example, in some implementations, a public blockchain's security includes a feature that changes made to a database/ledger of the blockchain are sent to all nodes of a blockchain to create a secure, established record of newly recorded data. For example, when the online gaming platform 100 requests that a hash value of one or more rounds of gameplay data be written to a blockchain system database/ledger, the blockchain system may write that hash value (along with other relevant blockchain record data) to one or more nodes of the blockchain (e.g., updating database records of the blockchain system). With copies of the blockchain data stored with some or all nodes of the blockchain, the overall blockchain database records remain safe even if some nodes of the blockchain are compromised/hacked. For verification in some implementations, for example, a hash value of gameplay data can be used to verify if the gameplay data stored by the online gaming platform 100 and/or audit module 250 has been tampered or manipulated. The verification of stored gameplay data can be done at any suitable time, wherein an auditing hash value can be generated from the raw gameplay data stored at the online gaming platform 100 using a same cryptographic hashing algorithm used to generate the hash at blocks 430 and 450. Similar to the auditing procedure described in connection with FIG. 3, if the generated auditing hash value matches the hash value derived from a blockchain record of the same gameplay data, the player and the online gaming platform 100 can determine that the gameplay data in the online gaming platform 100 database has not been altered or tampered after generating the multi-round hash value. The difference from FIG. 3 being that compared hash values are based on groupings of hashed rounds.

Figure 5A:
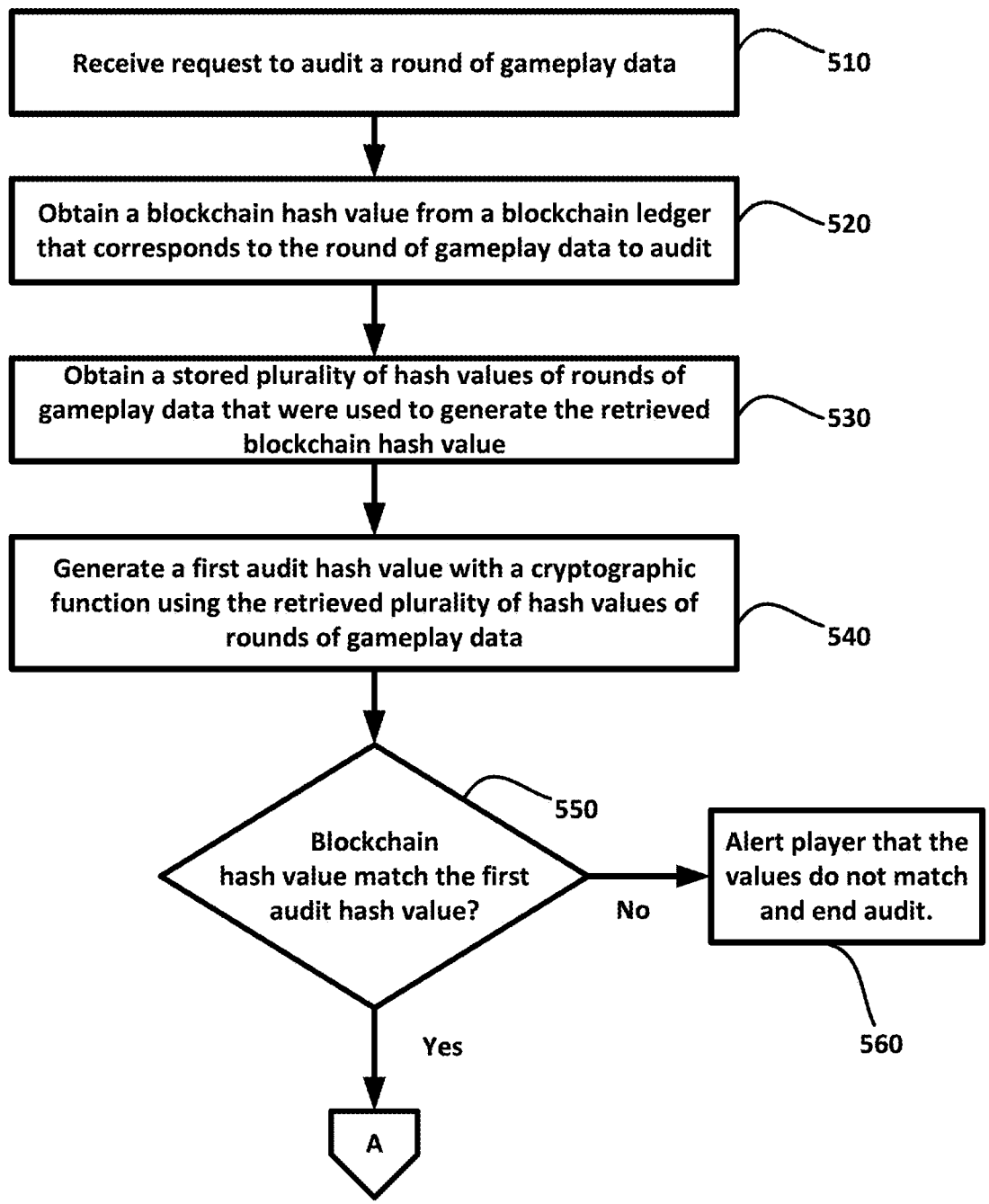
FIGS. 5a and 5b illustrate a flow chart showing an example implementation of a method of auditing fair gameplay.
Figure 5B:
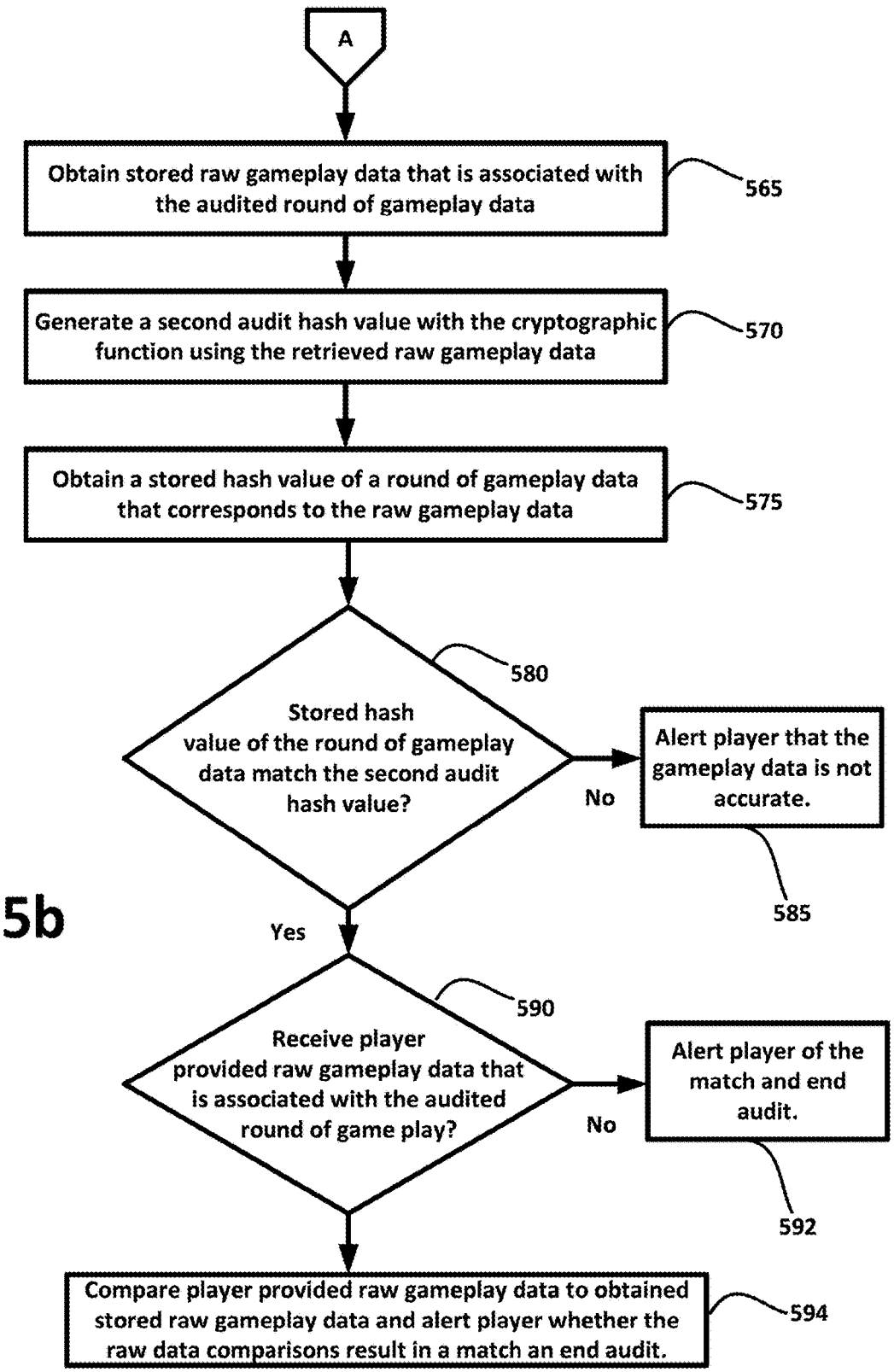

FIGS. 5a and 5b show some implementations of methods of auditing past gameplay data to corroborate a fair game, such as the gameplay data records discussed in connection with FIG. 4. In some implementations, the audit procedure begins with a request by a player to audit a round of gameplay data. As shown in block 510, the online gaming platform 100 may receive a request to audit a round of gameplay data. As noted above, the online gaming platform 100 may restrict access to historical records of one or more rounds of gameplay data to the players that participated in the game round of gameplay data that is sought for auditing. In some implementations, a system administrator may also have access to the stored gameplay data. Thus, in instances where the gameplay data is restricted, the online gaming platform 100 may perform verification based on the requesting player's information before granting access to audit the requested round of gameplay data. It should also be appreciated, that in some implementations, the historical records of gameplay data are not restricted and no verification is required before accessing the stored gameplay data.

In some implementations, as shown in block 520, the online gaming platform 100 may obtain a blockchain hash value from a blockchain ledger/database that corresponds to the round of gameplay data to audit. For example, the online gaming platform 100 can store a blockchain transaction ID in association with the round of gameplay data under audit so that the online gaming platform 100 can later know which hash value to retrieve from the blockchain ledger.

In some implementations, as shown in block 530, the online gaming platform 100 may also obtain a stored plurality of hash values of rounds of gameplay data that were used to generate the retrieved blockchain hash value. For example, as discussed in connection with FIG. 4, block 450, the online gaming platform 100 may have concatenated multiple rounds of gameplay data hash values into one hash value to reduce the payload sizes and quantity of transactions with a blockchain. Thus, to perform a check between a hash value stored on the blockchain and the stored gameplay data, the system uses the same multiple rounds of gameplay data hash values that were used to create the multi-round hash value stored on the blockchain.

In some implementations, as shown in block 540, the online gaming platform 100 may generate a first audit hash value with a cryptographic function using the retrieved plurality of hash values of rounds of gameplay data. In some implementations, the cryptographic function used is the same cryptographic function originally used to create the multi-round hash value in FIG. 4. It should be appreciated that blocks 520 and 530 can be performed serially or in parallel. Once the first audit hash value is generated and the appropriate multi-round hash value was retrieved from the blockchain system, the online gaming platform 100 may compare the two values, as shown in block 550. The online gaming platform 100 determines whether the first audit hash value and the multi-round hash value match (e.g., blockchain hash value). If the two hash values match, the online gaming platform 100 may determine that gameplay data stored in databases associated with the online gaming platform 100 are accurate and have not been altered since the online gaming platform 100 recorded such gameplay data on the blockchain. As shown in block 550, in some implementations where the online gaming platform 100 determines that the two hash values match, the online gaming platform 100 may continue the audit process described in FIG. 5B. In some implementations, the continued audit process provides additional layers of review of the data that the online gaming platform 100 generated and stored as well as permitting the player to check their own data against the online gaming platform 100. For example, a player may want to use their own data to further confirm that the gamplay data that the online gaming platform 100 recorded was not manipulated. In some implementations, the online gaming platform 100 may alert the player requesting the audit that the hash values match. In some implementations, the online gaming platform 100 may alert the player requesting the audit that the hash values match and end the audit.

On the other hand, if the two hash values don't match, the online gaming platform 100 may determine that gameplay data stored in databases associated with the online gaming platform 100 may be inaccurate. In some implementations, the online gaming platform 100 may alert the player requesting the audit that hash values do not match and may end the audit, as illustrated at block 560. However, in some implementations, the audit may continue for additional review of the stored gameplay data regardless of the mismatch of the hash values. Because the hash values used for comparison in block 550 were comprised of multiple different rounds of gameplay data, it may be possible that the round of gameplay data that is being audited may still be accurate while one or more other rounds of gameplay data grouped with the audited round are inaccurate. Thus, additional auditing can be performed to further narrow the scope of the discrepancy between datasets.

FIG. 5b illustrates some implementations of additional auditing of gameplay data from FIG. 5a. In some implementations, where the multi-round hash values do match or do not match, the online gaming platform 100 may additionally use a comparison of hash values derived from the round of gameplay data under audit. As illustrated in block 565, in some implementations, the online gaming platform 100 may obtain stored raw gameplay data that is associated with the audited round of gameplay data. In some implementations, the online gaming platform 100 may generate a second audit hash value with the cryptographic function using the obtained raw gameplay data as illustrated in block 570. In some implementations, as illustrated in block 575, the online gaming platform 100 may also obtain a stored hash value of the round of gameplay data under audit (e.g., from the database that stores hash values of individual rounds discussed at block 440 in FIG. 4).

Once the second audit hash value is generated and the appropriate stored hash value of the round of gameplay data under audit is retrieved, the online gaming platform 100 may compare the two values, as shown in block 580. The online gaming platform 100 determines whether the second audit hash value and the stored hash value of the round of gameplay data under audit match. In some implementations, if the two hash values do not match, the online gaming platform 100 may determine that gameplay data stored in databases associated with the online gaming platform 100 has been altered since the online gaming platform 100 recorded such gameplay data on the blockchain. As shown in block 585, in some implementations, the online gaming platform 100 may alert the player requesting the audit that the gameplay data did not result in a match and end the audit. In some implementations, if the two hash values match, the online gaming platform 100 may determine that gameplay data stored in databases associated with the online gaming platform 100 has not been altered since the online gaming platform 100 recorded such gameplay data on the blockchain. As shown in block 585, in some implementations, the online gaming platform 100 may alert the player requesting the audit that the gameplay data is resulted in a match and end the audit.

In some implementations, as the data used in blocks 565-580 is all based on data stored within the online gaming platform 100, the player may not trust that the data has not been altered. In some implementations, the online gaming platform 100 further enables a comparison of raw gameplay data. For example, in some implementations, as illustrated in block 590, the online gaming platform 100 may determine that the player provided raw gameplay data that the player collected. In some implementations, the online gaming platform 100 may provide an interface for the player to upload raw game data (e.g., a text field in a webpage, a file upload, etc.). In some implementations, the player provided raw gameplay data may come from the player's client computing device (e.g., gameplay data that the gaming application stored locally at the client computing device during the game). In some implementations, as shown in block 594, the online gaming platform 100 may obtain the raw gameplay data associated with the round of gameplay under audit. The online gaming platform 100 determines whether the player provided raw gameplay data and the stored raw gameplay data of the round under audit result in a match. If the two datasets match, the online gaming platform 100 may determine that gameplay data of the round under audit stored in databases associated with the online gaming platform 100 is accurate and has not been altered. As shown in block 592, in some implementations, when the player does not provide raw gameplay data for further auditing, the online gaming platform 100 may alert the player requesting the audit that the stored gameplay data resulted in a match from block 580 and end the audit. In some implementations, the online gaming platform 100 may also alert the player that by not comparing player provided raw gameplay data, the audit may be considered incomplete.

It should be appreciated that in some implementations, a player does not need to have knowledge of any other rounds of data in order to verify that the information recorded on the blockchain is correct (e.g., for the comparison at block 550). In various implementations, the audit process can be stopped at any time. In some implementations, where the audit process is stopped early, the online gaming platform 100 may provide an indication to the player of the outcome of the audit up to the point the audit was stopped.

In some implementations, the online gaming platform 100 can use player provided gameplay data as additional verification that stored gameplay data is accurate. In some implementations, the game values entered by the players that participate in a round of a game can be recorded. These gameplay values can be referred herein after as the players' values. The players' values of the players that participated in the round of a game can be pooled by the online gaming platform 100. These players' values from the players can then be compared to the stored gameplay data, the integrity of which has already been verified by the multi-round hash value recorded with on a public blockchain system. If the players' values match with the values of the stored gameplay data, this can further ensure that the gameplay was fair. In case discrepancies are found (e.g., the players' values don't match with the stored gameplay data, the round of the game can be investigated for improprieties. Implementations of the present disclosure has been illustrated using the blockchain, however any similar technology can also be used without departing from the scope of the present disclosure. Similarly, any function other than the SHA-256 cryptographic function can also be used to generate hash values, such as SHA-3 and MD-5.

In some implementations gameplay data is encrypted in one or more databases. Asymmetric encryption may be employed where both the online gaming platform 100 and players receive their own public-private key combination. In some implementations, the keys can be unique to each round of gameplay, maximizing the security of the encrypted data. Because the online gaming platform 100 may record player ID's in the rounds of gameplay, it is possible to limit access to certain store gameplay data based on the player's private keys. Further, in some implementations, using a role-permission based application layer with multi-factor authentication, the online gaming platform 100 can also ensure that users access their own gameplay data and not gameplay data of other users.

In some implementations, the online game platform further allows players to have betting challenges using any fiat, cryptocurrency, or any other assets from online (internet) or offline (real life) with any games such as video games, sports games, board games, or any other games online or in person. For example, two players while playing a game can make a bet. The online gaming platform 100 can enable players to challenge and accept these bets. The gameplay data resulting from these bets can then be captured to both ensure the fair gameplay and award the correct winner. The online gaming platform 100 can provide corroborating evidence for fair gameplay. In some implementations, if one of the players disagrees with the winning outcome, then the online gaming platform 100 can review the gameplay using the blockchain store data and help resolve the dispute.

It should thus be appreciated that one purpose of recording hash values of gameplay data is to enable players to utilize blockchain ledgers as a source of truthful history to audit gameplay and to ensure no malfeasance by anyone. Since a player will know their own hands, as well as all visible cards, a player can compare known hand histories with records on the database. Additionally, since gameplay data is made public in some implementations, a player can view a history of cards dealt and determine if patterns exist that suggest any undisclosed advantage for the house or a particular player.

It should also be appreciated that by using one or more of the implementations disclosed herein, where a system operator decides to change gameplay values to hide a cheat, and then publish those doctored values, the hashes posted to the blockchain would not match with the one generated from the published (doctored) values. Similarly, if the system operator published a hash of already doctored values to the blockchain, the system operator may reveal these doctored values when the gameplay data is made public.

In some implementations, the online gaming platform disclosed herein can be programmed into a computer readable media. Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The present disclosure is not to be limited in terms of the particular implementations described in this application, which are intended as illustrations of various aspects. Moreover, the various disclosed implementations can be interchangeably used with each other, unless otherwise noted. Many modifications and variations can be made without departing from its spirit and scope, as will be apparent to those skilled in the art. Functionally equivalent methods and apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular implementations only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

A number of implementations of the invention have been described. Various modifications may be made without departing from the spirit and scope of the invention. For example, various forms of the flows shown above may be used, with steps re-ordered, added, or removed. Accordingly, other implementations are within the scope of the following claims.

What is claimed is:

1. An online gaming platform comprising:
   at least one computer server communicable with at least one client computing device over a network, the computer server having a processor and a memory;
   a gaming engine module stored in the memory and executable by the processor, the gaming engine module having program code that when executed, generates an interactive gameplay instance playable on the client computing device;
   an audit module stored on the memory and executable by the processor, the audit module having program code that when executed:
      capture gameplay data;
      store the gameplay data in a first database;
      process the gameplay data with a hash function to obtain a hash value;
      record the hash value with a blockchain server; and
      verify integrity of the stored gameplay data using the recorded hash value; and
   a virtual currency module stored on the memory and executable by the processor, the virtual currency module having program code that when executed:
      issues and manages virtual currency accounts in addition to performing currency exchange between real currency and virtual currency;
      enables displays, in near real time on the client computing device, balance and transactions of the virtual currency account in the real currency value;

issues private keys for operating the virtual currency accounts; and wherein the virtual currency can be received in the virtual currency account by winning in a game or as a gift.

2. The online gaming platform of claim 1, wherein the online gaming platform further comprises a ghost module for operably coupling the online gaming platform with other crypto exchange platforms.

3. The online gaming platform of claim 1, wherein the gameplay data comprises fiat to cryptocurrency conversion value, bet value in fiat, bet value in cryptocurrency, player id, house rake, hand play type, card value, game outcome, total pot, game number, and hand number.

4. The online gaming platform of claim 1, wherein the captured gameplay data is encrypted, and the audit module further:
    decrypts the captured gameplay data before storing in the database;
    encrypts the stored gameplay data; and
    decrypts the encrypted gameplay activity data before the step of processing.

5. The online gaming platform of claim 1, wherein the gameplay comprises a plurality of rounds, the audit module further:
    store decrypted gameplay data for the plurality of rounds;
    process the decrypted gameplay data of one or more rounds with the hash function to obtain
    a first hash value for each round; and
    processing the first hash values of a plurality of the rounds with the hash function to obtain a multi-round hash value.

6. The online gaming platform of claim 5, wherein the audit module further:
    verifies integrity of the first hash values using the recorded multi-round hash value; and
    verifies integrity of the decrypted gameplay data of at least one round.

7. The online gaming platform of claim 1, wherein the audit module further:
    records players' values of at least one players who participated in the gameplay;
    receive the recorded players' values of at least one player; and
    compare the recorded players' values of at least one player with the stored gameplay data
    to determine fair gameplay,
    wherein the integrity of the stored gameplay data is verified just before or after the comparison.

8. The online gaming platform of claim 1, wherein the hash function is an SHA-256 cryptographic function.

9. The online gaming platform of claim 1, wherein the blockchain system is a public blockchain system.

10. The online gaming platform of claim 1, wherein the gameplay is from an online game, wherein the online game is a game of chance.

11. The online gaming platform of claim 1, wherein the gaming engine module further:
    receives a challenge from a first player; and
    receives acceptance of the challenge from a second player,
    wherein the challenge relates to the gameplay.

12. The online gaming platform of claim 1, wherein the virtual currency module further comprises program code that when executed, issues credits, tokens, and gifts as the virtual currency.

13. The online gaming platform of claim 1, wherein the virtual currency is in one of a Bitcoin, Litecoin, and Ripple.

14. The online gaming platform of claim 1, wherein the virtual currency module further comprises a digital wallet module.

15. A method of operating an online gaming platform, comprising:
    at least one computer server communicable with at least one client computing device over a network, the computer server having a processor and a memory;
    generating, with a server, an interactive gameplay instance playable on a client computing device;
    capturing, with the server, gameplay data;
    storing, with the server, the gameplay data in a first database;
    processing, with the server, the gameplay data with a hash function to obtain a hash value;
    recording, with the server, the hash value with a blockchain server;
    verifying, with the server, integrity of the stored gameplay data using the recorded hash value; and
    issuing and managing virtual currency accounts in addition to performing currency exchange between real currency and virtual currency;
    transmitting, to a client computing device, balance and transactions of the virtual currency account in the real currency value for display at the client computing device in near real time;
    issuing, with the server, private keys for operating the virtual currency accounts; and
    wherein the virtual currency can be received in the virtual currency account by winning in a game or as a gift.

16. The method of operating an online gaming platform of claim 15, wherein the online gaming platform further comprises a ghost module for operably coupling the online gaming platform with other crypto exchange platforms.

17. The method of operating an online gaming platform of claim 15, wherein the gameplay data comprises fiat to cryptocurrency conversion value, bet value in fiat, bet value in cryptocurrency, player id, house rake, hand play type, card value, game outcome, total pot, game number, and hand number.

18. The method of operating an online gaming platform of claim 15, wherein the captured gameplay data is encrypted, and further comprises:
    decrypting, with the server, the captured gameplay data before storing in the database;
    encrypting, with the server, the stored gameplay data; and
    decrypting, with the server, the encrypted gameplay activity data before the step of processing.

19. The method of operating an online gaming platform of claim 15, wherein the gameplay comprises a plurality of rounds, and further comprises:
    storing, using the server, decrypted gameplay data for the plurality of rounds;
    processing, using the server, the decrypted gameplay data of one or more rounds with the hash function to obtain
    a first hash value for each round; and
    processing the first hash values of a plurality of the rounds with the hash function to obtain a multi-round hash value.

20. The method of operating an online gaming platform of claim 19, further comprising:
    verifying integrity of the first hash values using the recorded multi-round hash value; and verifying integrity of the decrypted gameplay data of at least one round.

\* \* \* \* \*